United States Patent [19]

Garg et al.

[11] Patent Number: 5,290,480
[45] Date of Patent: Mar. 1, 1994

[54] PROCESS FOR PRODUCING FURNACE ATMOSPHERES BY DEOXYGENATING NON-CRYOGENICALLY GENERATED NITROGEN WITH DISSOCIATED AMMONIA

[75] Inventors: Diwakar Garg, Macungie; Paul T. Kilhefner, Wescosville; Donald P. Eichelberger, Macungie; Brian B. Bonner, Nesquehoning, all of Pa.

[73] Assignee: Air Products and Chemicals, Inc., Allentown, Pa.

[21] Appl. No.: 995,618

[22] Filed: Dec. 22, 1992

[51] Int. Cl.$^5$ ............................................... C06D 7/00
[52] U.S. Cl. .................................... 252/375; 148/230; 148/238; 252/374; 423/351
[58] Field of Search .................. 252/372, 374, 375; 423/351; 148/230, 238

[56] References Cited

U.S. PATENT DOCUMENTS

| | | | |
|---|---|---|---|
| 2,601,221 | 6/1952 | Rosenblatt et al. | 252/375 |
| 2,606,875 | 8/1952 | Rosenblatt et al. | 252/375 |
| 3,379,507 | 4/1968 | Becker et al. | 23/288 |
| 3,598,538 | 8/1971 | Peacock | 23/281 |
| 4,386,972 | 6/1983 | Knight | 148/230 |

FOREIGN PATENT DOCUMENTS

| | | |
|---|---|---|
| 4556189 | 11/1989 | Australia . |
| 4556289 | 11/1989 | Australia . |
| 0404496 | 6/1990 | European Pat. Off. . |
| 2639249 | 5/1990 | France . |
| 2639251 | 5/1990 | France . |

OTHER PUBLICATIONS

P. Murzyn & L. Flores, Jr., Carburizing with Membrane N$_2$: Process and Quality Issues, Mar. 1988, pp. 28–32.

H. Walton; New Method of Generating Nitrogen for Controlled Atmosphere Heat Treatment at Torrington Shiloh Plant, Mar. 1986, pp. 40–46.

P. F. Strutton, The Use of Non–Cryogenically Produced Nitrogen in Furnace Atmospheres, 1989, pp. 63–67.

D. J. Bowe & D. L. Fung, How PSA Nitrogen Works in a Heat Treating Shop, pp. 30–33 (Nov., 1980).

*Primary Examiner*—Wayne Langel
*Attorney, Agent, or Firm*—James C. Simmons; William F. Marsh

[57] ABSTRACT

A process for producing low-cost furnace atmospheres suitable for annealing and heat treating ferrous and non-ferrous metals and alloys, brazing metals and ceramics, sealing glass to metals, and sintering non-ferrous metal and ceramic powders from non-cryogenically produced nitrogen containing from 0.05 to 5.0% residual oxygen is presented. The disclosed process involves 1) mixing non-cryogenically produced nitrogen with a predetermined amount of dissociated ammonia, 2) passing the mixture through a low-pressure drop catalytic reactor, 3) converting the residual oxygen to an acceptable form such as moisture and reducing the residual oxygen level to below about 10 ppm, and 4) using the resultant gaseous mixture for annealing and heat treating ferrous and non-ferrous metals and alloys, brazing metals and ceramics, sealing glass to metals, and sintering non-ferrous metal and ceramic powders. The key feature of the disclosed process involves the use of a novel low-pressure drop catalytic reactor for converting residual oxygen with dissociated ammonia to moisture.

12 Claims, No Drawings

PROCESS FOR PRODUCING FURNACE ATMOSPHERES BY DEOXYGENATING NON-CRYOGENICALLY GENERATED NITROGEN WITH DISSOCIATED AMMONIA

FIELD OF THE INVENTION

The present invention pertains to enhanced utilization of non-cryogenically produced nitrogen.

BACKGROUND OF THE INVENTION

Nitrogen-based atmospheres have been routinely used by the heat treating industry both in batch and continuous furnaces since the mid 1970s. Because of the low dew point and virtual absence of oxygen, nitrogen-based atmospheres do not exhibit oxidizing and decarburizing properties and are therefore suitable for a variety of heat treating operations. More specifically, a mixture of nitrogen and hydrogen has been extensively used for annealing of low to high carbon and alloy steels, annealing of ferrous and non-ferrous metals and alloys such as carbon steel, copper, copper alloys, gold alloys, and sintering metal and ceramic powders. A mixture of nitrogen and a hydrocarbon gas such as methane and propane has gained wide acceptance for neutral hardening and decarburized-free annealing of medium to high carbon steels. A mixture of nitrogen and methanol has been developed and used for carburizing low to medium carbon steels. Finally, a mixture of nitrogen, hydrogen, and/or moisture has been used for brazing metals and sealing glass to metals.

A portion of nitrogen used by the heat treating industry is produced by distillation of air in large cryogenic plants.

Likewise, a portion of hydrogen used by the heat treating industry is produced by either partial oxidation or steam reforming of natural gas. Both nitrogen and hydrogen produced by these techniques are generally expensive. Additionally, the nitrogen-hydrogen atmospheres prepared by blending these gases are also expensive. To reduce the overall cost, a large number of heat treaters have been producing nitrogen-hydrogen atmospheres by decomposing (or cracking) ammonia in ammonia dissociators.

Ammonia dissociators generally decompose ammonia into a mixture of nitrogen and hydrogen over a bed of nickel, iron, or nickel/iron catalyst supported on a ceramic material. U.S. Pat. Nos. 3,598,538, 3,379,507, and 4,179,407 describe ammonia dissociators in detail. The catalyst promotes the following ammonia dissociation reaction:

$$2NH_3 = N_2 + 3H_2$$

This reaction is endothermic and requires heating of the catalyst bed to a temperature ranging from 600° C. to 950° C. from an outside source. The operating pressure of the process generally ranges from 2 psig to 10 psig with a space velocity used for the dissociation reaction generally varying from 500 to 5,000 Nm³/h product gas per m³ of the catalyst. The product gas generally contains a mixture of 25% nitrogen and 75% hydrogen with some ppm of residual ammonia. The content of unconverted ammonia in the product gas can vary from 30 ppm to 500 ppm depending on the operating temperature, pressure, and space velocity. Furthermore, the amount of unconverted ammonia in the product gas is generally known to increase with an increase in the operating pressure. Therefore, heat treaters generally prefer to operate ammonia dissociators at low pressures (below about 8 psig) to minimize the amount of unconverted ammonia in the product gas.

The concentration of hydrogen in nitrogen-hydrogen atmospheres required for the majority of heat treating operations generally varies from about 0.2 to about 25%. Since cryogenically produced nitrogen is cheaper than nitrogen-hydrogen atmosphere produced by dissociating ammonia, heat treaters normally blend cryogenically produced nitrogen with dissociated ammonia product gas to reduce overall atmosphere cost and to produce nitrogen-hydrogen atmosphere with the desired composition. However, these heat treaters are still experiencing the dilemma of high nitrogen-hydrogen atmosphere cost, thus, it is becoming increasingly difficult for them to compete effectively in world markets.

Since the concentration of nitrogen in nitrogen-hydrogen atmospheres varies from about 75%, to 99.8%, it is conceivable to reduce the overall cost of nitrogen-hydrogen atmospheres by replacing cryogenically produced nitrogen with low-cost nitrogen produced by non-cryogenic air separation techniques such as pressure swing adsorption and selective permeation (membrane). The non-cryogenically produced nitrogen costs less to produce, however, it contains from 0.05 to 5.0%, residual oxygen, making a direct substitution of cryogenically produced nitrogen with non-cryogenically produced nitrogen difficult, if not impossible, for certain applications.

Furnace atmospheres suitable for heat treating applications have been generated from non-cryogenically produced nitrogen by removing residual oxygen or converting it to an acceptable form in external catalytic units prior to feeding the atmospheres into the furnace. Such atmosphere generation methods have been described in detail in French publication numbers 2,639,249 and 2,639,251 dated Nov. 24, 1988 and Australian patent application numbers AU45561/89 and AU45562/89 dated Nov. 24, 1988. These methods require use of external units packed with precious metal catalysts such as palladium and platinum supported on ceramic balls or pellets. These external catalytic units can in principle be used to convert residual oxygen present in non-cryogenically produced nitrogen with dissociated ammonia to moisture and produce nitrogen-hydrogen atmospheres suitable for heat treatment. These reactors, however, result in considerable pressure drop, making it difficult, if not impossible, to mix low-pressure dissociated ammonia stream with non-cryogenically produced nitrogen and flow the mixture through them. Therefore, heat treaters have not considered using dissociated ammonia for deoxygenating non-cryogenically produced nitrogen and producing nitrogen-hydrogen atmospheres suitable for heat treatment.

Based upon the above discussion, it is clear that there is a need to switch from cryogenically produced nitrogen to non-cryogenically produced nitrogen for reducing the overall cost of nitrogen-hydrogen atmospheres for heat treaters that are generating nitrogen-hydrogen atmospheres using ammonia dissociators.

SUMMARY OF THE INVENTION

The present invention pertains to a process for producing low-cost nitrogen-hydrogen atmospheres suitable for annealing and heat treating ferrous and non-ferrous metals and alloys, brazing metals and ceramics, sealing glass to metals, and sintering non-ferrous metal and ceramic powders from non-cryogenically produced nitrogen containing from 0.05 to 5.0% residual oxygen. According to the process, suitable atmospheres are produced by 1) mixing non-cryogenically produced nitrogen with a predetermined amount of dissociated ammonia, 2) passing the mixture through a low-pressure drop catalytic reactor, 3) converting the residual oxygen to an acceptable form such as moisture and reducing the residual oxygen level to below about 10 ppm, and 4) using the resultant gaseous mixture for annealing and heat treating ferrous and non-ferrous metals and alloys, brazing metals and ceramics, sealing glass to metals, and sintering non-ferrous metal and ceramic powders.

According to one embodiment of the invention, nitrogen-hydrogen atmospheres suitable for bright annealing of copper and copper alloys and sintering of copper and copper alloy powders are produced by mixing non-cryogenically produced nitrogen and dissociated ammonia and passing the mixture through a low-pressure drop catalytic reactor to convert residual oxygen to moisture. The flow rate of dissociated ammonia mixed with the non-cryogenically produced nitrogen is controlled in a way that the amount of hydrogen present in the dissociated ammonia stream is at least 1.05 times the stoichiometric amount required for complete conversion of residual oxygen to moisture.

According to another embodiment of the invention, nitrogen-hydrogen atmospheres suitable for oxide-free and bright annealing of gold alloys are produced by mixing non-cryogenically produced nitrogen and dissociated ammonia and passing the mixture through a low-pressure drop catalytic reactor to convert residual oxygen to moisture. The flow rate of dissociated ammonia mixed with the non-cryogenically produced nitrogen is controlled in a way that the amount of hydrogen present in the dissociated ammonia stream is at least 3.0 times the stoichiometric amount required for complete conversion of residual oxygen to moisture.

According to another embodiment of the invention, nitrogen-hydrogen atmospheres suitable for controlled, tightly packed oxide annealing without any scaling and rusting of low to high carbon and alloy steels are produced by mixing non-cryogenically produced nitrogen and dissociated ammonia and passing the mixture through a low-pressure drop catalytic reactor to convert residual oxygen to moisture. The flow rate of dissociated ammonia mixed with the non-cryogenically produced nitrogen is controlled in a way that the amount of hydrogen present in the dissociated ammonia stream is between 1.05 and 1.5 times the stoichiometric amount required for complete conversion of residual oxygen to moisture.

According to another embodiment of the invention, nitrogen-hydrogen atmospheres suitable for bright, oxide-free and partially decarburized annealing of low to high carbon and alloy steels are produced by mixing non-cryogenically produced nitrogen and dissociated ammonia and passing the mixture through a low-pressure drop catalytic reactor to convert residual oxygen to moisture. The flow rate of dissociated ammonia mixed with the non-cryogenically produced nitrogen is controlled in a way that the amount of hydrogen present in the dissociated ammonia stream is at least 3.0 times the stoichiometric amount required for complete conversion of residual oxygen to moisture.

According to another embodiment of the invention, nitrogen-hydrogen atmospheres suitable for brazing metals and ceramics, sealing glass to metals, sintering non-ferrous metal ceramic powders, ceramic co-firing, ceramic metallization, and annealing of non-ferrous metals and alloys are produced by mixing non-cryogenically produced nitrogen and dissociated ammonia and passing the mixture through a low-pressure drop catalytic reactor to convert residual oxygen to moisture. The flow rate of dissociated ammonia mixed with the non-cryogenically produced nitrogen is controlled in a way that the amount of hydrogen present in the dissociated ammonia stream is at least 1.05 times the stoichiometric amount required for complete conversion of residual oxygen to moisture.

A feature of the process of the present invention include the use of a low-pressure drop catalytic reactor to convert residual oxygen present in the non-cryogenically produced nitrogen with dissociated ammonia to an acceptable form and reduce the residual oxygen to below 10 ppm level. More specifically, the reactor design consists of catalyst supported on a honeycomb structure, which is primarily responsible for the low pressure drop.

DETAILED DESCRIPTION OF THE INVENTION

The present invention relates to a process for generating low-cost atmospheres suitable for annealing and heat treating ferrous and nonferrous metals and alloys, brazing metals and ceramics, sealing glass to metals, and sintering non-ferrous metal and ceramic powders using non-cryogenically produced nitrogen and dissociated ammonia. The process of the present invention is based on the surprising discovery that nitrogen-hydrogen atmospheres suitable for the above described annealing and heat treating operations can be generated from non-cryogenically produced nitrogen by 1) mixing it with a low-pressure dissociated ammonia stream and 2) deoxygenating it by passing the mixture through a low-pressure drop catalytic reactor.

A portion of nitrogen used by the heat treating industry is produced by distillation of air in large cryogenic plants. Likewise, a portion of hydrogen used by the heat treating industry is produced by either partial oxidation or steam reforming of natural gas. Both nitrogen and hydrogen produced by these techniques are very expensive. The nitrogen-hydrogen atmospheres required for a variety of annealing, heat treating, brazing, sealing, and sintering operations and prepared by blending these gases are also very expensive. To reduce cost, a large number of heat treaters have been producing nitrogen-hydrogen atmospheres by decomposing (or cracking) ammonia in ammonia dissociators. They are also blending nitrogen with nitrogen-hydrogen stream produced from ammonia dissociators to further reduce the atmosphere cost. However, due to the present economic situation, these heat treaters are desperately looking for alternative to further reduce the overall atmosphere cost. With the advent of non-cryogenic technologies for air separation, it is now conceivable to produce nitrogen-hydrogen atmospheres at low cost. The non-cryogenically produced nitrogen, however, is contaminated with up to 5% residual oxygen, which is generally undesirable for many heat treating applications. The presence of residual oxygen has made the direct substitution of cryogenically produced nitrogen in nitrogen-hydrogen atmospheres with that produced by non-cryogenic techniques difficult.

Several attempts to substitute cryogenically produced nitrogen in nitrogen-hydrogen atmospheres with that produced non-cryogenically in continuous furnaces have met limited success. The metallic parts treated with non-cryogenically produced nitrogen-hydrogen atmospheres were always scaled, rusted, or heavily oxidized. These problems are believed to be related to exposure of parts at high temperatures with residual oxygen present in the non-cryogenically produced nitrogen.

According to the present invention scaling, rusting, and severe oxidation problems caused by residual oxygen present in the non-cryogenically produced nitrogen are surprisingly resolved by mixing non-cryogenically produced nitrogen with a pre-determined amount of dissociated ammonia, passing the mixture through a low-pressure drop catalytic reactor, and converting the residual oxygen to an acceptable form such as moisture prior to introducing the feed mixture into a annealing or heat treating furnace. The key functions of the low-pressure drop catalytic reactor is to facilitate conversion of residual oxygen with dissociated ammonia to an acceptable form and reducing the residual oxygen to below about 10 ppm level.

The residual oxygen in non-cryogenically produced nitrogen for the process of the present invention can vary from 0.05% to about 5%, preferably from about 0.1% to about 2%, and ideally, it can vary from about 0.20% to about 1.00%.

The non-cryogenically produced nitrogen and dissociated ammonia streams are mixed in such a proportions that the amount of hydrogen present in the dissociated ammonia stream is at least 1.05 times the stoichiometric amount required for converting residual oxygen to moisture and reducing the residual oxygen level in the product gas stream to below about 10 ppm.

The amount of dissociated ammonia stream mixed with non-cryogenically produced nitrogen stream depends whether controlled oxidizing or reducing conditions are desired for the particular heat treating operation. For example, if a controlled oxidizing condition is desired, the amount of dissociated ammonia is adjusted in a way that $pH_2/pH_2O$ ratio in the reactor effluent stream is low enough that it is oxidizing to the material heat treated in the furnace. If a reducing condition is desired, the amount of dissociated ammonia is adjusted in a way that $pH_2/pH_2O$ ratio in the reactor effluent stream is high enough that it is reducing to the material being heat treated in the furnace.

The external catalytic reactor consists of precious metal catalyst supported on a metallic or a ceramic honeycomb structure to avoid problems related to pressure drop through the reactor. The precious metal catalyst supported on honeycomb structure can be selected from platinum group metals such as platinum, palladium, rhodium, ruthenium or mixtures thereof. The cell density in the honeycomb structure can vary from about 100 to 400 cells per square inch. A cell density above about 200 cells per square inch is especially preferable. The metal concentration in the catalyst can vary from about 0.05 to about 1.0 wt. % (or from about 10 to 30 mg precious metal per cubic foot of catalyst volume). Preferably, the catalyst is approximately from about 0.2 to 0.5 wt. % palladium or a mixture of platinum and palladium in the metal form supported on honeycomb structure. The honeycomb structure can be similar to the one described in a technical brochure "VOC destruction through catalytic incineration" published by Johnson Matthey, Wayne, Pa. It can also be similar to the ones described in technical brochures "High Performance Catalytic Converters With Metal Cores" published by Camet Co., Hiram, Ohio and "Celcor (registered trade mark of Corning) Honeycomb Catalysts Support" published by Corning, N.Y.

The hourly flow rate of gaseous mixture flowing through the low-pressure drop catalytic reactor can vary from about 100 to 50,000 times the volume of the reactor, preferably from about 500 to 20,000 times the volume of the reactor, and ideally from about 2,000 to 10,000 times the volume of the reactor.

The catalytic reactor requires no external heating if the gaseous feed mixture is supplied at a temperature of 50° F. or above. This is because the reaction between dissociated ammonia and residual oxygen over the above described catalysts is self-initiating in nature. The catalytic reactor will heat up automatically because of the exothermic nature of the reaction. The final temperature of the reactor will depend upon the concentration of the residual oxygen present in the feed stream. However, it may be necessary to heat the reactor or the feed gas initially to start the reaction if the feed gas temperature is supplied at a temperature below about 50° F. The external heating of the reactor may be turned off once the reaction has been initiated.

A continuous furnace operated at atmospheric or above atmospheric pressure with separate heating and cooling zones is ideal for the present invention. The continuous furnace can be of the mesh belt, a roller hearth, a pusher tray, a walking beam, or a rotary hearth type.

A continuous furnace operated at atmospheric or above atmospheric pressure with a heating zone and an integrated quench cooling zone is also ideal for the present invention. The continuous furnace can be of the mesh belt, shaker, a roller hearth, a pusher tray, a shaker hearth, a rotary retort, or a rotary hearth type.

A batch furnace is also ideal for annealing and sintering of non-ferrous metals and alloys according to the present invention.

The reactor effluent gas can be fed directly into the heated zone of a continuous furnace with a separate cooling zone or an integrated quench cooling zone, saving heating requirements for the furnace. The effluent gas can be used to pre-heat the gaseous feed mixture prior to introducing it into the catalytic reactor. The effluent gas can be cooled using a heat exchanger and fed into the transition zone located between the heating and cooling zone or into the cooling zone of a continuous furnace with a separate cooling zone. Finally, the effluent gas can be divided into two or more streams and fed into the heating and cooling zones of a continuous furnace with a separate cooling zone. It can also be introduced into the furnace through multiple injection ports located in the heating and cooling zones.

The reactor effluent gas can also be fed directly into the batch furnace. Alternatively, it can be cooled prior to introducing into the batch furnace. Preferably, the effluent gas is introduced directly into the batch furnace without any cooling during the heating cycle to assist in heating parts. Additionally, it is cooled prior to introducing into the batch furnace during the cooling cycle to assist in cooling parts.

Low to high carbon or alloy steels that can be heat treated according to the present invention can be selected from the groups 10XX, 11XX, 12XX, 13XX, 15XX, 40XX, 41XX, 43XX, 44XX, 47XX, 48XX, 50XX, 51XX, 61XX, 81XX, 86XX, 87XX, 88XX, 92XX, 92XX, 93XX, 50XXX, 51XXX, or 52XXX as described in Metals Handbook, Ninth Edition, Volume 4 Heat Treating, published by American Society for Metals. Tool steels selected from the groups AX, DX, HX, OX, MX, or SX, iron nickel based alloys such as Incoloy, nickel alloys such as Inconel and Hastalloy, nickel-copper alloys such as Monel, gold alloys, and cobalt based alloys such as Haynes and Stellite can be heat treated according to process disclosed in this invention.

Copper and copper alloys that can be annealed according to the present invention can be selected from the groups C101 to C782 as described in Table A, pages 7-2 to 7-2 of Metals Handbook, Desk Edition, published by American society of Metals (Fifth printing, October 1989). The copper based powders that can be sintered according to the present invention can be selected from Cu, Cu-Zn with up to 40% Zn, Cu-Pb-Zn with up to 4% Pb and 40%, Zn, Cu-Sn-Zn with up to 10% Sn and 40% Zn, Cu-Sn-Pb-Zn with up to 4% Pb, 10% Sn, and 40% Zn, Cu-Si with up to 4% Si, Cu-Zn-Mn with up to 40% Zn and 3% Mn, Cu-Al, Cu-Al-Fe, Cu-Al-Si, Cu-Fe-Zn-Sn-Mn, Cu-Zn-Al-Co, Cu-Al-Ni-Zn, Cu-Zn-Si, Cu-Fe-Ni-Mn, Cu-Fe-Ni, Cu-Ni with up to 30% Ni, Cu-Zn-Ni with up to 30% Zn and 20% Ni, Cu-Zn-Cr-Fe-Mn, and Cu-pb-Zn-Ni. Other elements such as P, Cd, Te, Mg, Ag, Zr, $Al_2O_3$, etc. can optionally be added to the copper-based powders to obtain the desired properties in the final sintered product. Additionally, they can be mixed with up to 2% carbon to provide lubricity to the final sintered product. Finally, they can be mixed with up to 2% zinc stearate to help in pressing parts from them.

According to the present invention, nitrogen-hydrogen atmospheres suitable for bright annealing of copper and copper alloys and sintering of copper and copper alloy powders produced by mixing non-cryogenically produced nitrogen and dissociated ammonia and passing the mixture through a low-pressure drop catalytic reactor to convert residual oxygen to moisture. The flow rate of dissociated ammonia mixed with the non-cryogenically produced nitrogen is controlled in a way that the amount of hydrogen present in the dissociated ammonia stream is at least 1.05 times the stoichiometric amount required for complete conversion of residual oxygen to moisture.

Nitrogen-hydrogen atmospheres suitable for oxide-free and bright annealing of gold alloys are produced by mixing non-cryogenically produced nitrogen with dissociated ammonia containing at least 3.0 times the stoichiometric amount hydrogen required for complete conversion of residual oxygen to moisture and passing the mixture through a low-pressure drop catalytic reactor to convert residual oxygen to moisture.

Nitrogen-hydrogen atmospheres suitable for controlled, tightly packed oxide annealing without any scaling and rusting of low to high carbon and alloy steels are produced by mixing non-cryogenically produced nitrogen with dissociated ammonia containing between 1.05 and 1.5 times the stoichiometric amount hydrogen required for complete conversion of residual oxygen to moisture and passing the mixture through a low-pressure drop catalytic reactor to convert residual oxygen to moisture.

Nitrogen-hydrogen atmospheres suitable for bright, oxide-free and partially decarburized annealing of low to high carbon and alloy steels are produced by mixing non-cryogenically produced nitrogen with dissociated ammonia containing at least 3.0 times the stoichiometric amount hydrogen required for complete conversion of residual oxygen to moisture and passing the mixture through a low-pressure drop catalytic reactor to convert residual oxygen to moisture.

Nitrogen-hydrogen atmospheres suitable for brazing metals and ceramics, sealing glass to metals, sintering non-ferrous metal ceramic powders, ceramic co-firing, ceramic metallization, and annealing of non-ferrous metals and alloys are produced by mixing non-cryogenically produced nitrogen with dissociated ammonia containing at least 1.05 times the stoichiometric amount hydrogen required for complete conversion of residual oxygen to moisture and passing the mixture through a low-pressure drop catalytic reactor to convert residual oxygen to moisture.

EXPERIMENTAL PROCEDURE

Two different external catalytic reactors were used to convert residual oxygen present in the non-cryogenically produced nitrogen with dissociated ammonia. A small 1 in. diameter reactor packed with approximately 0.005 $ft^3$ of precious metal catalyst was used initially to study the reaction between residual oxygen and dissociated ammonia. After these initial experiments, a 3 in. diameter reactor with 0.0736 $ft^3$ of catalyst was designed and integrated with a heat treating furnace to demonstrate the present invention. The effluent stream from the catalytic reactor was introduced into the area between the heating and cooling zones generally called as the transition zone of a Watkins-Johnson conveyor belt furnace capable of operating up to a temperature of 1,150° C. for the heat treating experiments.

The furnace was equipped with physical curtains both on entry and exit sections to prevent air from entering the furnaces. The samples heat treated in the furnace were heated rapidly in the heating zone. They were also cooled rapidly as they moved out of the heating zone and entered the cooling zone. It was passed through the furnace for at least one hour to purge the furnace prior to heat treating samples.

The following table and examples describe catalytic deoxygenation of non-cryogenically produced nitrogen with dissociated ammonia.

TABLE 1

| | EXAMPLE 1A | EXAMPLE 1B |
|---|---|---|
| Flow Rate of Feed Gas to Catalytic Reactor, SCFH | 50 | 50 |
| Feed Gas Composition | | |
| Oxygen, % | 0.5 | 0.5 |
| Hydrogen, % | 1.5 | 1.5 |
| Ammonia, ppm | 75 | 75 |
| Nitrogen | Balance | Balance |
| Catalyst | Pt/Pd on Metallic Honeycomb | Pt/Pd on Metallic Honeycomb |
| GHSV, 1/hr | 10,000 | 10,000 |
| Operating Time, hr | 0.5 | 170 |
| Effluent Gas Composition | | |
| Oxygen, ppm | <5 | <5 |
| Hydrogen, % | ~0.5 | ~0.5 |
| Moisture, % | 1.0 | 1.0 |

EXAMPLE 1A

A gas stream containing non-cryogenically produced nitrogen and dissociated ammonia was simulated by mixing nitrogen stream containing 0.5% (5,000 ppm) oxygen with 1.5% hydrogen and 75 ppm of ammonia. This stream was deoxygenated by passing it through a 1 in. diameter catalytic reactor packed with 0.2% platinum plus palladium metal catalysts supported on metallic honeycomb structure with a cell density of about 200 cells per square inch. The catalyst was supplied by Johnson Matthey of Wayne, Pa. The amount of hydrogen in the simulated stream was 1.5 times the stoichiometric amount required to convert oxygen completely to water. The hourly flow rate of nitrogen stream through the reactor was 10,000 times the volume of the reactor (Gas Hourly Space Velocity or GHSV of 10,000 1/h), as shown in Table 1. The gaseous feed stream was at ambient temperature and the reactor was not heated from an external heating source.

The reactor effluent stream contained less than 5 ppm of residual oxygen, as shown in Table 1. The pressure drop through the reactor was less than 0.5 psi. The reactor was heated automatically to a temperature close to 70° C. due to exothermic nature of the reaction between oxygen and hydrogen. This example demonstrates that a low pressure drop catalytic reactor packed with platinum plus palladium metal catalysts supported on a honeycomb structure can be used to convert residual oxygen present in non-cryogenically produced nitrogen to moisture with dissociated ammonia.

EXAMPLE 1B

The catalytic deoxygenation experiment described in Example 1A was repeated using identical reactor and conditions. The reactor was operated continuously for a total of 170 hours without interruption. The oxygen level in the reactor effluent stream was always less than 5 ppm, showing no deactivation of the catalyst with residual ammonia. This example showed that dissociated ammonia can be used to deoxygenate non-cryogenically produced nitrogen using a low pressure drop catalytic reactor.

EXAMPLE 2

A gas stream containing non-cryogenically produced nitrogen and dissociated ammonia was simulated by mixing nitrogen stream containing 0.5% (5,000 ppm) oxygen with 1.5% hydrogen and 15 ppm of ammonia. This stream was deoxygenated by passing it through a 3 in. diameter catalytic reactor packed with 0.5% platinum plus palladium metal catalysts supported on metallic honeycomb structure with a cell density of about 200 cells per square inch. The catalyst was supplied by Johnson Matthey of Wayne, Pa. The amount of hydrogen in the simulated stream was 1.5 times the stoichiometric amount required to convert oxygen completely to water. The hourly flow rate of nitrogen stream through the reactor was 4,800 times the volume of the reactor (Gas Hourly Space Velocity or GHSV of 4,800 1/h). The gaseous feed stream was at ambient temperature and the reactor was not heated from an external heating source. The reactor effluent stream contained less than 2 ppm of residual oxygen, ~0.5 hydrogen, and ~1.0% moisture. The ratio of $pH_2/pH_2O$ in the effluent stream was ~0.5. The pressure drop through the reactor was measured to be negligible. The reactor effluent gas was employed in heat treating examples described below.

EXAMPLE 2A

The reactor effluent gas stream from Example 2 was introduced into the transition zone of the Watkins-Johnson furnace operated at ~700° C. to anneal copper samples. The samples were annealed with a uniform, bright surface finish. This example showed that nitrogen-hydrogen atmosphere suitable for bright annealing copper can be produced by mixing non-cryogenically produced nitrogen and dissociated ammonia.

EXAMPLE 2B

The reactor effluent gas stream from Example 2 was introduced into the transition zone of the Watkins-Johnson furnace operated at ~700° C. to anneal low carbon steel samples. The samples were annealed with a uniform, blue/gray oxide surface finish. The $pH_2/pH_2O$ ratio of ~0.5 in the effluent stream was not high enough to yield bright product. However, it was just right to produce uniform, oxide annealed product. This example showed that nitrogen-hydrogen atmosphere suitable for oxide annealing carbon steel can be produced by mixing non-cryogenically produced nitrogen and dissociated ammonia.

EXAMPLE 2C

The reactor effluent gas stream from Example 2 was introduced into the transition zone of the Watkins-Johnson furnace operated at ~827° C. to sinter samples made of bronze powder. The samples contained ~0.75% zinc stearate and ~1.0% carbon. They were not delubed prior to sintering. The samples were sintered with a surface finish similar to that observed with a similar sample sintered in pure nitrogen-hydrogen atmosphere. Cross-sectional analysis of a sintered part showed it to have a microstructure similar to that noted with a similar sample sintered in pure nitrogen-hydrogen atmosphere. The physical dimensions of the sintered samples were well within the specified limits. Furthermore, they were very similar to those noted with a similar sample sintered in pure nitrogen-hydrogen atmosphere. This example showed that nitrogen-hydrogen atmosphere suitable for sintering copper alloys can be produced by mixing non-cryogenically produced nitrogen and dissociated ammonia.

EXAMPLE 3

A gas stream containing non-cryogenically produced nitrogen and dissociated ammonia was simulated by mixing nitrogen stream containing 0.5% (5,000 ppm) oxygen with 3.0% hydrogen and 30 ppm of ammonia. It was deoxygenated by passing it through a catalytic reactor similar to the one described in Example 2. The amount of hydrogen in the simulated stream was 3.0 times the stoichiometric amount required to convert oxygen completely to water. The hourly flow rate of nitrogen stream through the reactor was 4,800 times the volume of the reactor (Gas Hourly Space Velocity or GHSV of 4,800 1/h). The reactor effluent stream contained less than 2 ppm of residual oxygen, ~2.0% hydrogen, and ~1.0% moisture. The ratio of $pH_2/pH_2O$ in the effluent stream was ~2.0. The pressure drop through the reactor was measured to be negligible. The reactor effluent gas was employed in heat treating examples described below.

EXAMPLE 3A

The reactor effluent gas stream from Example 3 was introduced into the transition zone of the Watkins-Johnson furnace operated at ~700° C. to anneal copper samples. The samples were annealed with a uniform, bright surface finish. This example showed that nitrogen-hydrogen atmosphere suitable for bright annealing copper can be produced by mixing non-cryogenically produced nitrogen and dissociated ammonia.

EXAMPLE 3B

The reactor effluent gas stream from Example 3 was introduced into the transition zone of the Watkins-Johnson furnace operated at ~700° C. to anneal low carbon steel samples. The samples were annealed with a mixture of bright and oxide surface finish. The $pH_2/pH_2O$ ratio of ~2.0 in the effluent stream was neither high enough to yield bright product nor low enough to produce uniform, oxide annealed product. This example showed that nitrogen-hydrogen atmosphere suitable for bright and oxide annealing carbon steels cannot be produced by improperly mixing non-cryogenically produced nitrogen and dissociated ammonia.

EXAMPLE 3C

The reactor effluent gas stream from Example 3 was introduced into the transition zone of the Watkins-Johnson furnace operated at ~8270° C. to sinter samples made of bronze powder. The samples contained ~0.75% zinc stearate and ~1.0% carbon. They were not delubed prior to sintering. The samples were sintered with a surface finish similar to that observed with a similar sample sintered in pure nitrogen-hydrogen atmosphere. Cross-sectional analysis of a sintered part showed it to have a microstructure similar to that noted with a similar sample sintered in pure nitrogen-hydrogen atmosphere. The physical dimensions of the sintered samples were well within the specified limits. Furthermore, they were very similar to those noted with a similar sample sintered in pure nitrogen-hydrogen atmosphere. This example showed that nitrogen-hydrogen atmosphere suitable for sintering copper alloys can be produced by mixing non-cryogenically produced nitrogen and dissociated ammonia.

EXAMPLE 4

A gas stream containing non-cryogenically produced nitrogen and dissociated ammonia was simulated by mixing nitrogen stream containing 0.50% (5,000 ppm) oxygen with 5.0% hydrogen and 50 ppm of ammonia. It was deoxygenated by passing it through a catalytic reactor similar to the one described in Example 2. The amount of hydrogen in the simulated stream was 5.0 times the stoichiometric amount required to convert oxygen completely to water. The hourly flow rate of nitrogen stream through the reactor was 4,800 times the volume of the reactor (Gas Hourly Space Velocity or GHSV of 4,8001 /h). The reactor effluent stream contained less than 2 ppm of residual oxygen, ~4.0% hydrogen, and ~1.0% moisture. The ratio of $pH_2/pH_2O$ in the effluent stream was ~4.0. The pressure drop through the reactor was measured to be negligible. The reactor effluent gas was employed in heat treating examples described below.

EXAMPLE 4A

The reactor effluent gas stream from Example 4 was introduced into the transition zone of the Watkins-Johnson furnace operated at ~700° C. to anneal copper samples. The samples were annealed with a uniform, bright surface finish. This example showed that nitrogen-hydrogen atmosphere suitable for bright annealing copper can be produced by mixing non-cryogenically produced nitrogen and dissociated ammonia.

EXAMPLE 4B

The reactor effluent gas stream from Example 4 was introduced into the transition zone of the Watkins-Johnson furnace operated at ~700° C. to anneal low carbon steel samples. The samples were annealed with a uniform, bright surface finish. The $pH_2/pH_2O$ ratio of ~4.0 in the effluent stream was high enough to yield bright product. Cross sectional analysis of the sample showed approximately 0.006 inch thick decarburized layer. This example showed that nitrogen-hydrogen atmosphere suitable for bright, partially decarburized annealing carbon steels can be produced by properly mixing non-cryogenically produced nitrogen and dissociated ammonia.

EXAMPLE 4C

The reactor effluent gas stream from Example 4 was introduced into the transition zone of the Watkins-Johnson furnace operated at ~827° C. to sinter samples made of bronze powder. The samples contained ~0.75% zinc stearate and ~1.0% carbon. They were not delubed prior to sintering. The samples were sintered with a surface finish similar to that observed with a similar sample sintered in pure nitrogen-hydrogen atmosphere. Cross-sectional analysis of a sintered part showed it to have a microstructure similar to that noted with a similar sample sintered in pure nitrogen-hydrogen atmosphere. The physical dimensions of the sintered samples were well within the specified limits. Furthermore, they were very similar to those noted with a similar sample sintered in pure nitrogen-hydrogen atmosphere. This example showed that nitrogen-hydrogen atmosphere suitable for sintering copper alloys can be produced by mixing non-cryogenically produced nitrogen and dissociated ammonia.

We claim:

1. A process for generating atmospheres suitable for annealing and heat treating ferrous and non-ferrous metals and alloys, brazing metals and ceramics, sealing glass to metals and sintering non-ferrous metal and ceramic powders comprising the steps of:

combining non-cryogenically produced nitrogen containing up to five percent by volume residual oxygen with a low-pressure dissociated ammonia to form a mixture wherein the amount of hydrogen present is at least 1.05 times the stoichiometric amount required to convert residual oxygen in said mixture to moisture; and passing said mixture through a low pressure drop catalytic reactor containing a platinum group metal catalyst supported on a metallic or ceramic honeycomb structure, under conditions such that the effluent leaving said reactor contains less than about 10 ppm oxygen; and introducing said effluent into a heat treating furnace.

2. A process according to claim 1 including:

adjusting the amount of dissociated ammonia mixed with said non-cryogenically produced nitrogen so that the $pH_2/pH_2O$ ratio in the reactor effluent is low enough so that the effluent is oxidizing to material to be treated in the furnace.

3. A process according to claim 1 including adjusting the amount of dissociated ammonia mixed with said non-cryogenically produce nitrogen is adjusted so that $pH_2/pH_2O$ ratio in the reactor effluent is high enough so that the effluent is reducing to material to be treated in the furnace.

4. A process according to claim 1 including charging the reactor with a platinum group metal catalyst supported on a honeycomb structure having a cell density of 100 to 400 cells per square inch.

5. A process according to claim 1 including passing said mixture through said reactor at an hourly flow rate of between 100 and 50,000 times the volume of the reactor.

6. A process according to claim 1 including heating said reactor to a temperature sufficient to establish reaction between dissociated ammonia and residual oxygen in said nitrogen.

7. A process according to claim 1 including introducing said effluent into the heating zone of a continuous furnace with a separate cooling zone or an integrated quench cooling zone.

8. A process according to claim 1 including cooling said effluent and introducing said effluent into the transition zone located between the heating and cooling zone of a continuous furnace with a separate cooling zone.

9. A process according to claim 1 including heat exchanging said effluent with said mixture prior to introducing said mixture into said reactor.

10. A process according to claim 1 wherein said effluent is introduced directly into a batch heat treating furnace.

11. A process according to claim 4 wherein the catalyst is selected from the group consisting of platinum, palladium and mixtures thereof.

12. A process according to claim 11 wherein the concentration of metal in the catalyst is between 0.05 and 1% by weight.

* * * * *